United States Patent [19]

Covington

[11] Patent Number: 4,817,079
[45] Date of Patent: Mar. 28, 1989

[54] CARRIER RETAINER FOR DISK CARTRIDGE

[75] Inventor: Roger G. Covington, Rochester, N.Y.

[73] Assignee: Eastman Kodak Company, Rochester, N.Y.

[21] Appl. No.: 213,574

[22] Filed: Jun. 27, 1988

[51] Int. Cl.⁴ .................... B65D 85/30; G11B 23/04
[52] U.S. Cl. .................................. 369/291; 206/312; 360/133; 369/77.2
[58] Field of Search ............... 369/77.2, 291, 292; 206/309, 312, 444, 316; 360/133

[56] References Cited

U.S. PATENT DOCUMENTS

| | | | |
|---|---|---|---|
| 4,669,078 | 5/1987 | Ogusu | 369/291 |
| 4,722,439 | 2/1988 | Grobecker et al. | 206/444 |
| 4,746,013 | 5/1988 | Suzuki et al. | 369/291 |
| 4,749,081 | 6/1988 | Carlson et al. | 369/77.2 |
| 4,755,982 | 7/1988 | Douwes | 369/291 |

Primary Examiner—Steven L. Stephan
Attorney, Agent, or Firm—Warren W. Kurz

[57] ABSTRACT

A protective cartridge for a data storage disk (e.g. an optical disk) includes a retainer mechanism for restricting longitudinal movement of a disk/carrier assembly within the cartridge interior. Such mechanism preferably comprises a flexible, cantilever-mounted leaf spring having a lip which is adapted to engage a trailing edge of a disk-carrier after such carrier has entered the cartridge through a pivotably mounted cartridge door. To allow extraction of a retained disk-carrier from the cartridge, the retainer is located so it is engaged and moved to a non-retaining position by the cartridge door as the latter moves from a closed to an open position.

3 Claims, 5 Drawing Sheets

CARRIER RETAINER FOR DISK CARTRIDGE

BACKGROUND OF THE INVENTION

This invention relates to the field of data storage and retrieval and, more particularly, to improvements in apparatus for protectively packaging disk-shaped data storage media.

The need to protect the delicate recording surface of a data storage disk (e.g. optical, magnetic, and magneto-optic disks) is self-evident. In the commonly assigned U.S. application Ser. No. 923,509, filed Oct. 27, 1986 entitled "Carrier For Data Storage Disk" in the names of D. Stark et al, there is disclosed a protective package for a rigid optical disk. Such package comprises the combination of a disk "carrier" which surrounds the periphery of the disk and supports the disk at spaced locations about the disk periphery, and a protective cartridge or "caddy" which comprises a relatively rigid, box-like structure that totally encloses the disk/carrier assembly. One end of the protective cartridge is provided with a pair of spring-loaded doors which permit entry of the disk/carrier assembly into the cartridge interior. In response to a door-opening force, such as applied by the leading edge of the disk/carrier assembly as it moves in a direction to enter the cartridge interior, the cartridge doors swing inwardly. As the disk/carrier assembly slides into the cartridge, the cartridge doors ride on a protruding bearing surface of the carrier so as not to contact the recording surfaces of the disk. After the trailing edge of the disk/carrier assembly has cleared the cartridge doors, the doors swing to their normally closed position, thereby capturing the disk/carrier assembly within the cartridge.

In disk packages of the type described above, it will be appreciated that the cartridge interior must be somewhat longer than the length of the disk carrier in order to provide clearance for the cartridge doors to swing closed behind the entering disk/carrier assembly. This space requirement translates into a relatively loose fit between the disk/carrier assembly and the cartridge interior, allowing the disk/carrier assembly some degree of freedom to slide longitudinally (i.e. forward and backwards) within the cartridge interior. While this movement is relatively small, any substantial movement of the disk/carrier assembly within the cartridge interior can be detrimental to the structural integrity of the relatively delicate data storage disk.

SUMMARY OF THE INVENTION

In view of the foregoing discussion, an object of this invention is to provide a carrier-retaining apparatus for restricting the aforementioned longitudinal movement of a disk-carrier within a protective cartridge.

The carrier-retaining apparatus of the invention basically comprises a carrier-retainer member mounted within a cartridge for movement between (a) a carrier-retaining position in which such member will engage a disk-carrier that has fully entered the cartridge through a movable cartridge door and prevent such disk carrier from moving in a reverse direction, toward such door, and (b) a non-retaining position in which such member is spaced from a disk-carrier located within such container. The carrier-retaining is positioned to be engaged by the cartridge door and is movable thereby from its retaining position to its non-retaining position in response to movement of the cartridge door from a closed position to an open position. Preferably, the carrier-retaining member is biased towards its retaining position and comprises an elongated leaf spring which is mounted in a cantilever manner to a supporting surface within the cartridge. The leaf spring has a carrier-retaining lip which is adapted to engage and retain a carrier located within the cartridge, such leaf spring being deflectable by the cartridge door from a normal carrier-retaining position in which the lip will engage and retain a carrier located within the cartridge to a carrier-releasing position in which said lip is spaced from such carrier.

The invention and its advantages will become more apprent to those skilled in the art from the ensuing detailed description of preferred embodiments, reference being made to the accompanying drawings.

DETAILED DESCRIPTION OF PREFERRED EMBODIMENTS

Figure 1:
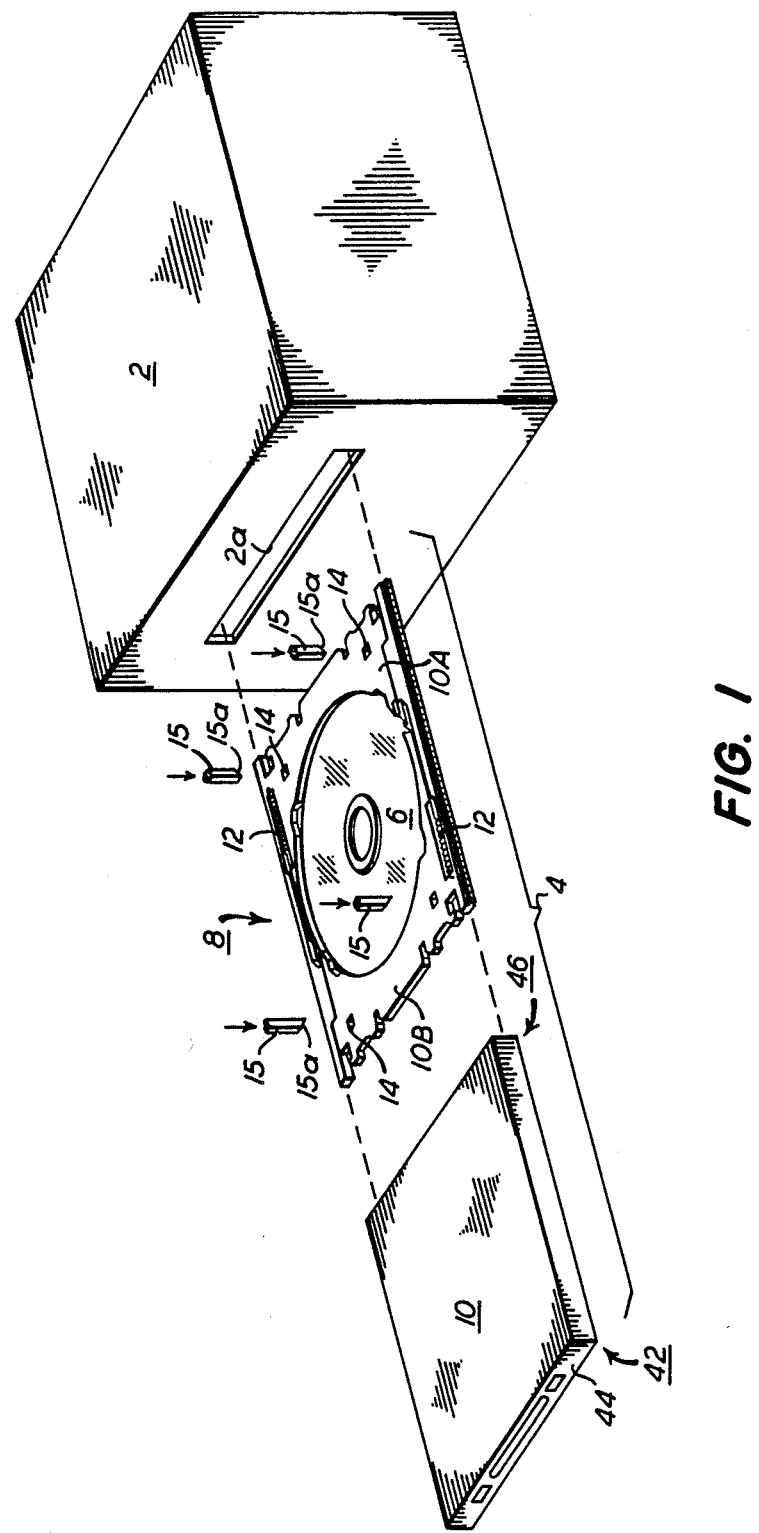
FIG. 1 is a schematic perspective view of data recording system of the type in which the invention is useful.

Referring now to the drawings, FIG. 1 illustrates a data recording/playback system comprising a disk drive unit 2 and a data storage disk assembly 4. The latter basically comprises a rigid data storage disk 6, a disk-carrier 8 and a protective cartridge 10. Disk-carrier 8 serves to releasably capture disk 6 so that the disk is accurately and securely registered within the carrier structure, yet is capable of being readily removed from the carrier for rotation in a plane spaced from the carrier. When not in use, the carrier and its captured disk are positioned within the protective cartridge, the latter being sufficiently rigid to guard against contact with the disk's recording surfaces. In use, the carrier-loaded cartridge is inserted into the disk drive unit through a slot 2a. Upon entering the disk drive unit, a mechanism within serves to extract the disk-carrier from the cartridge and to return the cartridge to the user. The disk drive unit also includes an apparatus for releasing the disk from its carrier and for loading the disk onto a drive spindle assembly for rotation. Such an apparatus is disclosed, for example, in the commonly assigned U.S. application No. 923,508, filed on Oct. 27, 1986 in the name of Dwight Petruchik et al.

Figure 2:
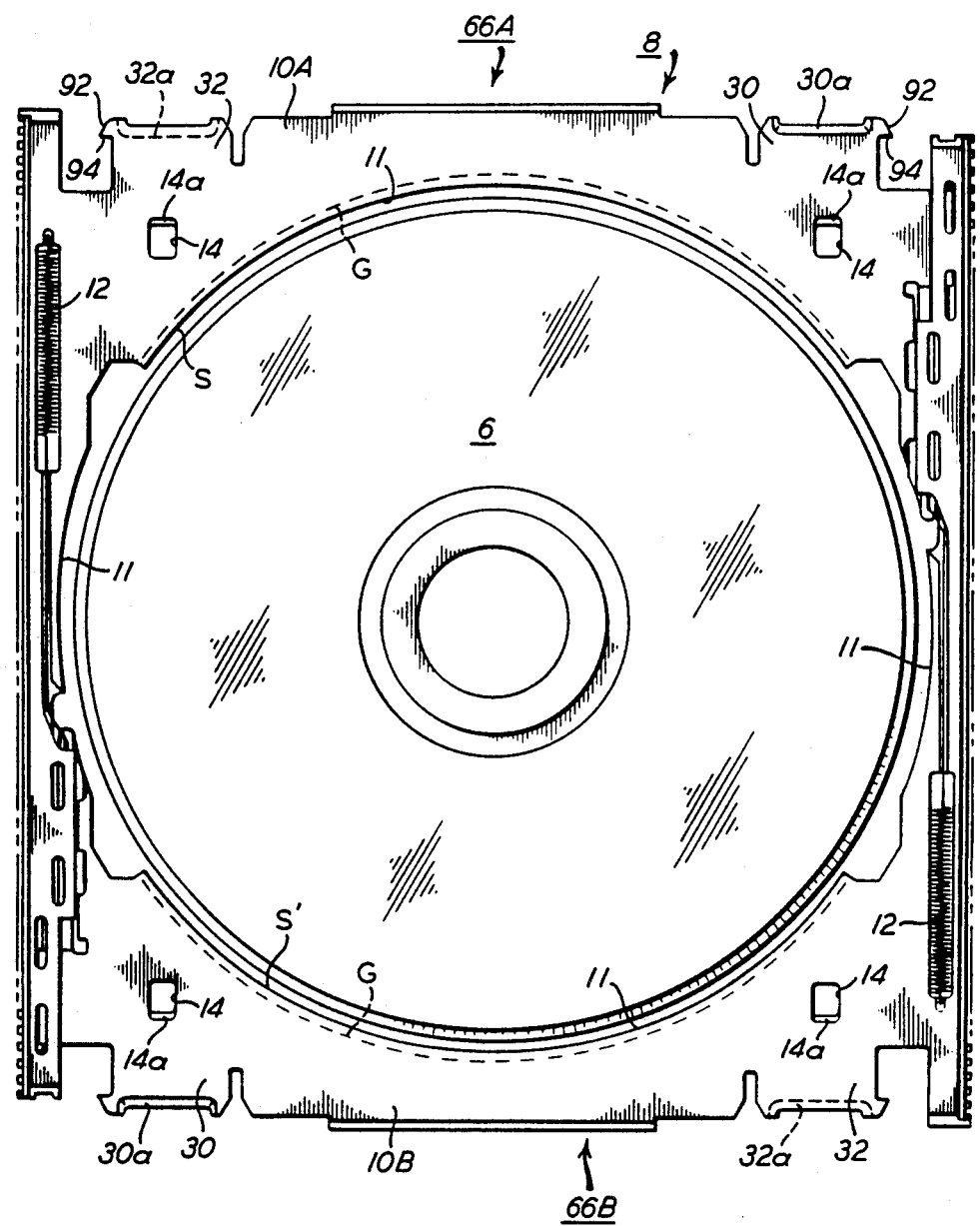
FIG. 2 is a plan view of a disk/carrier assembly.

Referring to FIG. 2 disk-carrier 8 basically comprises a pair of crescent-shaped frame members 10A, 10B having arcuate surfaces S, S', respectively, which cooperate to define a generally circular aperture 11 for receiving the data storage disk 6. The crescent-shaped frame members are slidably connected by a tongue groove arrangement so that the size of the circular aperture can be varied, whereby a data storage disk can be placed within the aperture when the frame members are relatively far apart from each other, as shown in FIG. 2. The arcuate surfaces are provided with grooves G which are adapted to receive the peripheral region of the disk 6. Springs 12 are connected between the frame members 10A and 10B to resiliently urge the frame members toward each other, i.e., toward a disk-capturing position wherein the grooves engage and support the peripheral region of the disk. Each frame member is provided with structure which facilitates movement of the frame members apart to enable release of the disk for use. Such structure may comprise, for example, a plurality of rectangular apertures 14, each having a bevelled edge 14a which is adapted to be engaged by a like plurality of release pins 15, shown in FIG. 1. The interaction of such release pins and apertures to effect disk release is fully described in the aforementioned Petruchik et al patent application. Briefly, however, downward movement of the release pins into apertures 14 causes cam surfaces 15a to engage the bevelled edges 14a of apertures 14. As the release pins move through these apertures, cam surfaces 15a exert lateral forces on the frame members, thereby tending to move such members apart against the biasing forces provided by springs 22.

Each of the frame members 10A and 10B are provided with shoulder portions 30, 32 which have bevelled surfaces 30a, 32a respectively. The bevelled surface 30a of the shoulder portion 30 faces upward and the bevelled surfaces 32a of the other shoulder portion 32 faces downward. Although a two-piece carrier is shown in FIG. 2, a carrier comprising one integral frame or any other suitable carriers can be used with the carrier-retaining apparatus of the invention.

With reference to FIGS. 3 to 7 cartridge 10 comprises a generally box-like structure having a pair of planar walls 34, 36 spaced apart by a pair of side walls 38, 40. One end 42 of the cartridge (see FIG. 1) is closed by an end wall 44, whereas the other end 46 has an opening 48 through which the disk-carrier can enter and exit from the cartridge interior. Door members 50, 52 are fixedly connected to the shafts 54, 56 which are rotatably supported by the side walls 38, 40 so that they extend along the opening 48. Torsion springs 58 (only one of them being shown in FIG. 4) are mounted on the shafts 54, 56 so that they urge the door members 50, 52 to their closed positions.

Figure 4:
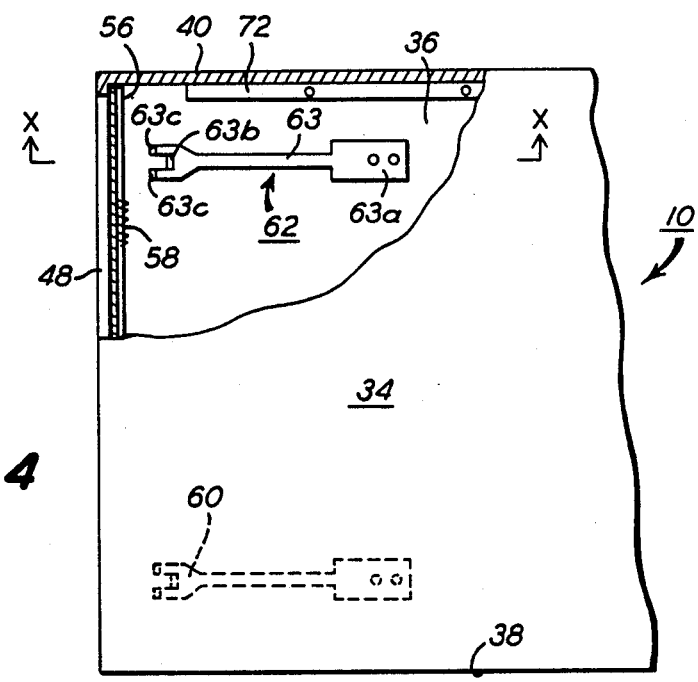
FIG. 4 is a top view of a cartridge with a portion thereof removed to better illustrate the interior.

According to the invention, cartridge 10 is provided with one, and preferably two, carrier retainer members 60, 62 which function to restrict the longitudinal movement (in the direction of arrow A) of a carrier which has been fully received by the cartridge. Such members are secure to the upper and lower cartridge walls 34, 36 respectively. Since the retainer members are identical, only one need be described. According to a preferred embodiment, each retainer member comprises a resilient bar or leaf spring 63 having one end 63a secured to one of planar walls of the cartridge in a cantilever fashion. A projection 64 is formed on the cartridge wall in the vicinity of the secured end of the leaf spring so that the spring is supported with its free end portion (i.e., its carrier-retaining portion) positioned in the path P of a cartridge door as the latter moves from a closed position (FIGS. 5 and 7) to an open position (FIG. 6). A portion of the free end portion of the leaf spring is curled inward to form a lip 63b, and a pair of door engaging tabs 63c extend outwardly therefrom, on both sides of lip 63b as shown in FIG. 4.

Figure 3:
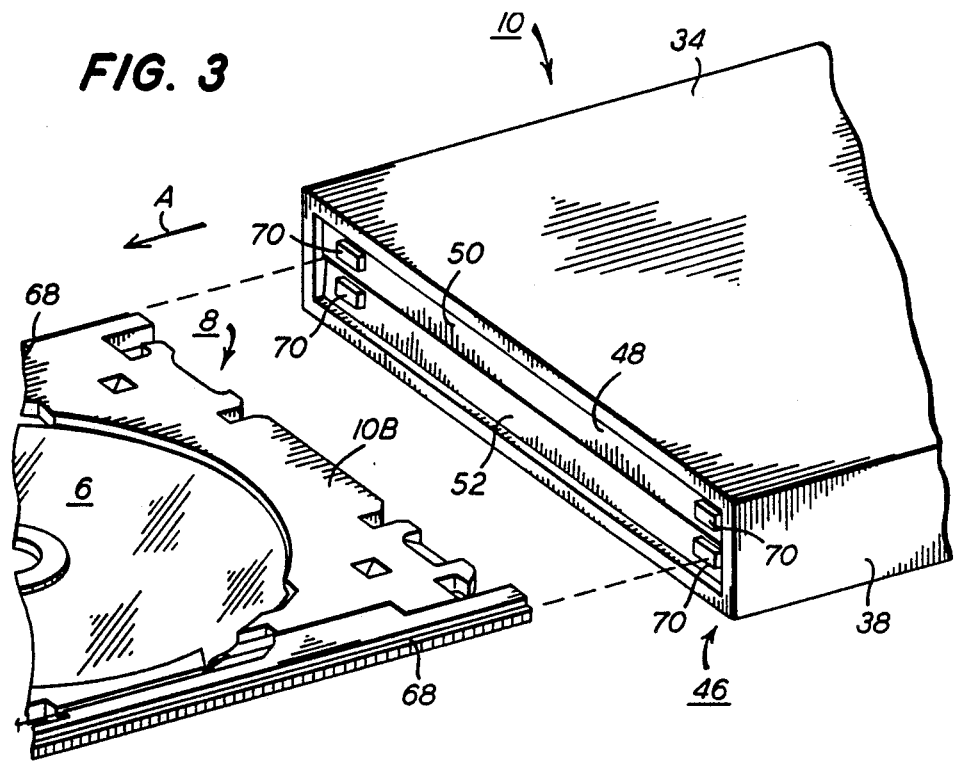
FIG. 3 is a perspective view showing a relationship between a disk protective cartridge and a disk/carrier assembly.
Figure 6:
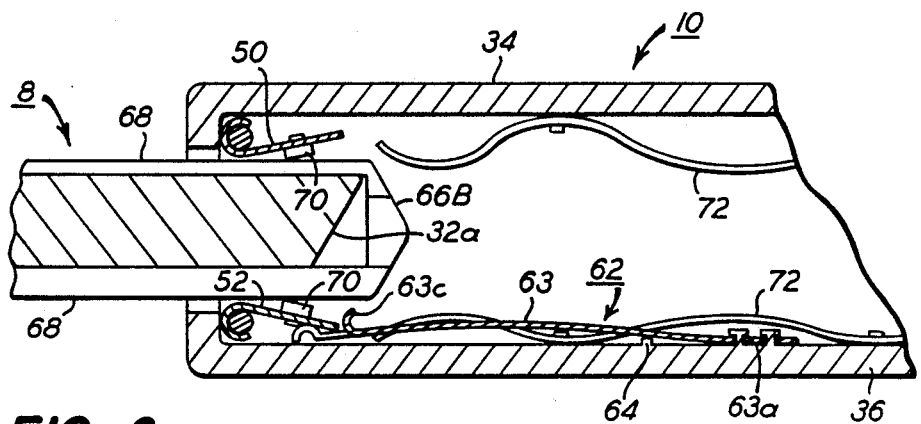
Figure 7:
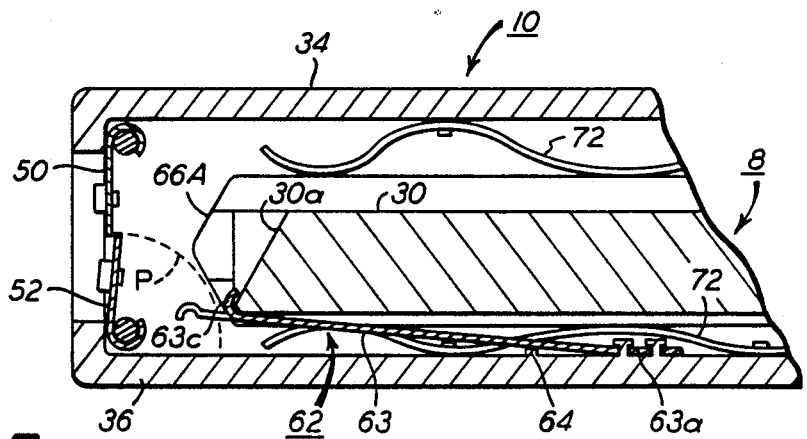

As is best shown in FIGS. 6 and 7, the leading and trailing edges 66A, 66B of carrier 8 are tapered so that opening of the door members 50, 52 is facilitated when the carrier is inserted in the cartridge 10. The carrier has raised rails 68 along the opposite sides and on the upper and lower surfaces of the carrier (FIGS. 3, 6 and 7). The door members 50, 52 also having bearing pieces in such place that the bearing pieces ride on the rails 68 when the carrier is inserted in the cartridge.

Figure 5:
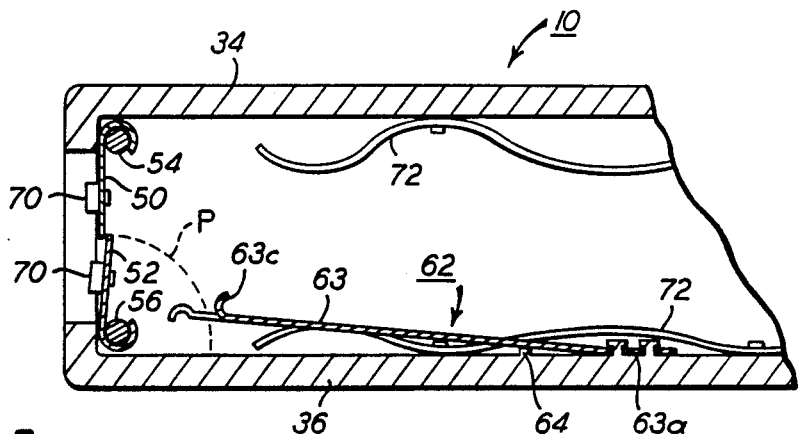
FIGS. 5, 6 and 7 are sectional views taken along line X—X showing a carrier-retaining mechanism in such conditions when the carrier is absent, partially inserted and fully received in the cartridge, respectively.

When the cartridge is empty, retainer member 62 and door members 50, 52 takes the position shown in FIG. 5. When disk-carrier 8 is inserted in the cartridge, as shown in FIG. 6, the carrier's tapered leading end edge 66B pushes door members 50, 52 against the force of the springs 58 so that the door members swing to the positions shown in FIG. 6. When the carrier proceeds into the cartridge, the engagement between the raised rails 68 and bearing pieces 70 keep the door members sufficiently open to prevent any portion of the door members from contacting and affecting the delicate recording surface of the disk 6. When the door member 52 pivots from its closed position to its open position, it engages the tabs 63c of retainer member 63 to deflect member 63 to such degree that lip 63b is spaced from the carrier 8. In order to assure that the carrier follows a desired path upon insertion into the cartridge, as well as to retain the carrier in a predetermined position equally spaced from the upper and lower walls 34, 36, corrugated resilient strips 72 are mounted on the inner surfaces of the upper and lower walls 34, 36. Such strips slidably engage the upper and lower surfaces of the carrier.

When the carrier 8 has been fully inserted in the cartridge and the trailing end edge 66A has cleared from the door members, the door members swing back to the closed positions, as shown in FIG. 7. The movement of the door members to their closed position allows the retainer member to spring back to a latching position in which lip 63 is allowed to engage the bevelled surface 30a of the shoulder portion 30 of the carrier. In this condition, the carrier 8 is arrested between the tab and the inner surface of the end wall 44 (FIG. 1) of the cartridge, permitting substantially no play of the carrier within the cartridge interior.

Figure 8:
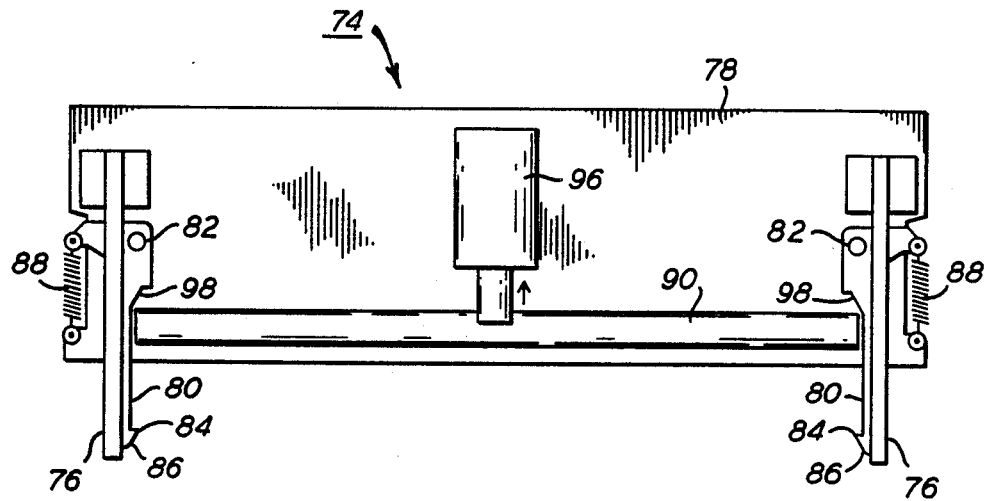
FIG. 8 is a top view of a latching mechanism for a disk drive for retaining the carrier when the cartridge is withdrawn from the carrier.

In use, the cartridge 10 with the disk-carrier 8 retained inside (as shown in FIG. 7) is inserted, door end in first, in the disk drive unit 2 through the slot 2a. The drive unit includes a carrier latching mechanism 74 (shown in FIG. 8) which comprises a pair of plungers 76 fixed to a frame 78 and a pair of movable latching pawls 80. The pawls are pivotally mounted on the frame 78 about pins 82 and are partially received in longitudinal slots (not shown) formed in the plungers. The pawls have hooks 84 and bevelled edges 86. Springs 88 are provided in order to urge the pawls to pivot inwardly. However, a cam plate 90 is provided to engage the inner surfaces of the pawls 80 to retain them in the position shown in FIG. 8. When the cartridge 10 is inserted in the disk drive unit 2, the plungers 76 enters the opening 48 of the cartridge causing door members 50, 52 to swing open. As the doors move to their open position, they deflect the retainer members away from the carrier, thereby unlatching the carrier. When the cartridge is further moved toward the latching mechanism 74, cam surfaces 92 formed on the shoulder portions 30, 32 engage the associated cam surfaces 86 on the pawls to make them pivot outwardly against the effect of the springs 88. Thereafter, hooks 84 snap fit in notches 94 formed in the shoulder portions. When the cartridge is withdrawn from the disk drive unit, the carrier remains inside, being captured by the latching mechanism 74. When the carrier 8 is to be released from mechanism 74 a solenoid 96 is actuated to move the cam plate 90 so that the cooperation between the cam plate and cam surfaces 98 on the pawls makes the pawls pivot outwardly to release the carrier. The structure and operation of the catcher is fully disclosed also in aforementioned U.S. application Ser. No. 923,508.

Although the invention has been described with reference to a particular embodiment, it will be appreciated to those skilled in the art that various modifications may be made within the spirit of the invention. For example, a single door may be used in place of the two doors of the foregoing embodiment. In this case, the cartridge needs a larger clearance behind the opening for permitting pivotal movement of the larger door. Even with this larger clearance, the carrier may be retained in the cartridge without any substantial play.

I claim:

1. Carrier-retaining apparatus for limiting movement of a data storage disk-carrier within a protective cartridge, such cartridge comprising a box-like container having a movably mounted door through which a disk-carrier can enter and exit the cartridge, said apparatus comprising:

a carrier-retainer member mounted within said container for movement between (a) a retaining position in which said member will engage a disk-carrier that has fully entered the container through such door and prevent such disk carrier from moving in a reverse direction, toward such door, and (b) a non-retaining position in which said member is spaced from a disk-carrier located within such container, said member being movable from said retaining position to said non-retaining position in response to movement of the cartridge door from a closed position to an open position.

2. The invention as defined by claim 1 wherein said carrier-retaining member is biased towards said retaining position.

3. The invention as defined by claim 1 wherein said carrier-retaining member comprises an elongaged leaf spring which is mounted in a cantilever manner to a supporting surface within the container, said leaf spring having a carrier-retaining lip which is adapted to engage and retain a carrier located within the container, said leaf spring being deflectable by the cartridge door from a normal carrier-retaining position in which said lip will engage and retain a carrier located within the container to a carrier-releasing position in which said lip is spaced from such carrier.

* * * * *